(12) United States Patent
Dewan

(10) Patent No.: US 10,708,713 B2
(45) Date of Patent: Jul. 7, 2020

(54) SYSTEMS AND METHODS FOR BEACON LOCATION VERIFICATION

(71) Applicant: Raveesh Dewan, Elkridge, MD (US)

(72) Inventor: Raveesh Dewan, Elkridge, MD (US)

(73) Assignee: Raveesh Dewan, Elkridge, MD (US)

( * ) Notice: Subject to any disclaimer, the term of this patent is extended or adjusted under 35 U.S.C. 154(b) by 0 days.

(21) Appl. No.: 15/946,764

(22) Filed: Apr. 6, 2018

(65) Prior Publication Data

US 2018/0295471 A1    Oct. 11, 2018

Related U.S. Application Data

(60) Provisional application No. 62/482,426, filed on Apr. 6, 2017.

(51) Int. Cl.

| | |
|---|---|
| *H04L 29/06* | (2006.01) |
| *H04W 12/08* | (2009.01) |
| *H04W 4/02* | (2018.01) |
| *H04W 4/12* | (2009.01) |
| *H04W 4/80* | (2018.01) |
| *G06F 16/29* | (2019.01) |
| *G06F 16/903* | (2019.01) |

(52) U.S. Cl.
CPC ............ *H04W 4/023* (2013.01); *G06F 16/29* (2019.01); *G06F 16/90335* (2019.01); *H04W 4/025* (2013.01); *H04W 4/12* (2013.01); *H04W 4/80* (2018.02)

(58) Field of Classification Search
CPC ......... H04W 4/80; H04W 4/02; H04W 4/023; H04W 4/029; H04W 64/003; H04W 8/005; H04L 67/22; H04L 67/18
See application file for complete search history.

(56) References Cited

U.S. PATENT DOCUMENTS

| | | | | |
|---|---|---|---|---|
| 9,032,531 | B1 * | 5/2015 | Scorvo | G06F 21/55 |
| | | | | 726/25 |
| 2015/0140982 | A1 * | 5/2015 | Postrel | H04W 4/12 |
| | | | | 455/418 |
| 2017/0026818 | A1 * | 1/2017 | Beaulieu | A01D 34/008 |
| 2018/0041489 | A1 * | 2/2018 | Narayanan | H04L 63/08 |
| 2018/0060911 | A1 * | 3/2018 | Deluca | G06Q 30/02 |
| | | | | 455/418 |

* cited by examiner

*Primary Examiner* — Gary Lafontant
(74) *Attorney, Agent, or Firm* — McDonnell Boehnen Hulbert & Berghoff LLP

(57) ABSTRACT

Embodiments include (i) receiving a first set of one or more messages generated by a mobile terminal, the first set of one or more messages comprising a first indication that the mobile terminal has detected a wireless beacon at a first time, and a second indication comprising a geographic location of the mobile terminal at the first time; (ii) determining whether the geographic location of the mobile terminal at the first time is within a threshold distance from a first physical location associated with the wireless beacon detected at the first time; and (iii) taking one or more further actions in response to determining whether the geographic location of the mobile terminal at the first time is or is not within the threshold distance from the first physical location associated with the wireless beacon.

18 Claims, 3 Drawing Sheets

SYSTEMS AND METHODS FOR BEACON LOCATION VERIFICATION

CROSS-REFERENCE TO RELATED APPLICATIONS

This application claims priority to U.S. Provisional Application 62/482,426, filed Apr. 6, 2017. The entire contents of the 62/482,426 application are incorporated herein by reference.

SUMMARY

Wireless beacons can provide various types of information to mobile terminals in a variety of scenarios. In operation, a one-way transmitter emits a wireless beacon, such as a Bluetooth Low Energy (BLE) wireless beacon or other type of wireless beacon, for compatible mobile terminals within an area to receive. Typically, an application running on the mobile terminal uses information received via the wireless beacon to perform additional functions.

Some wireless beacon use cases include transmitting data to mobile terminals where the data is relevant to a specific location. For example, a wireless beacon can transmit data that allows a mobile terminal to quickly and easily retrieve bus or train arrival times when the mobile terminal is within a few feet of a bus or train station.

One challenge with using wireless beacons to provide data for location-specific applications arises when a wireless beacon transmitter is moved from a first physical location to a second physical location because the location-specific information associated with the wireless beacon transmitted by the transmitter may not be relevant to the second physical location.

For example, if a wireless transmitter is moved from a first bus stop to a second bus stop, an application running on a mobile phone that retrieves data based on the wireless beacon (originally installed at the first bus stop) might retrieve information relevant to the first bus stop (e.g., bus arrival times) rather than information relevant to the second bus stop even though the transmitter has been moved from the first bus stop to the second bus stop. Similarly, if a doctor's office moves from a first address to a second address, an application running on a mobile phone that receives data based on the wireless beacon (originally installed at the first address) might retrieve information relevant to the first address (e.g., locations of nearby pharmacies) rather than information relevant to the second address, even though the transmitter has been moved from the first address to the second address.

Another challenge with using wireless beacons to provide data for location-specific applications arises when a bad actor copies data transmitted via a wireless beacon associated with a first location and uses the copy of the data associated with the first location at a second location to trigger a mobile terminal to take some undesirable action at the second location. For example, when the mobile terminal at the second location receives the "spoofed" wireless beacon at the second location, the mobile terminal may perform functions relevant to the first location (e.g., transmitting authentication credentials or other sensitive data) even though the mobile terminal is not at the first location.

To overcome the above-described and similar challenges arising with using wireless beacon transmitters for location-specific applications, some embodiments of the systems and methods disclosed and described herein include a database system that identifies discrepancies between physical locations associated with wireless beacons and location information corresponding to locations where mobile terminals detected the wireless beacons.

In some embodiments, a database system or other computing system maintains a database comprising a plurality of associations between a plurality of wireless beacons and a corresponding plurality of physical locations (e.g., street addresses, GPS coordinates, and/or other physical locations). In operation, some embodiments include a mobile terminal (i) receiving a wireless beacon comprising an identifier, and (ii) transmitting the identifier and the GPS location of the mobile terminal to the database system. The database system compares the physical location associated with the identifier (transmitted to the mobile terminal via the wireless beacon) with the GPS coordinates of the mobile terminal at the time the mobile terminal received the wireless beacon.

If the GPS coordinates of the mobile terminal are within a threshold distance of the physical location associated with the wireless beacon, then the computing system generates a notification indicating that the mobile terminal was within the threshold distance of the physical location associated with the wireless beacon. Some embodiments additionally or alternatively include transmitting one or more confirmation messages to one or more second computing systems associated with the wireless beacon in response to determining that the GPS coordinates of the mobile terminal are within the threshold distance of the physical location associated with the wireless beacon. Some embodiments additionally or alternatively include, (i) the mobile terminal sending an indication to the computing system at a second time when the mobile terminal has moved outside the threshold distance from the physical location associated with the wireless beacon, and (ii) the computing system determining a duration of time between when the mobile terminal reported receiving the wireless beacon and when the mobile terminal (or perhaps one or more other computing systems, individually or in combination with the mobile terminal) reported moving outside the threshold distance from the physical location associated with the wireless beacon. Further embodiments additionally or alternatively include the computing system (individually or in combination with one or more other computing systems) soliciting feedback from a person associated with the mobile terminal, where the feedback relates to activities that occurred or that the person engaged in during the duration of time between when the mobile terminal reported receiving the wireless beacon and when the mobile terminal (or perhaps one or more other computing systems, individually or in combination with the mobile terminal) reported moving outside the threshold distance from the physical location associated with the wireless beacon.

But if the GPS coordinates of the mobile terminal are not within a threshold distance of the physical location associated with the wireless beacon, then the computing system generates a notification indicating that the mobile terminal was not within the threshold distance of the physical location associated with the wireless beacon. Some embodiments additionally or alternatively include the computing system (i) determining (e.g., via operator input or other notification) that the transmitter configured to emit the wireless beacon has been moved to a new location, and (ii) updating a database with the new location for the transmitter configured to emit the wireless beacon.

This overview is illustrative only and is not intended to be limiting. In addition to the illustrative aspects, embodiments, and features described herein, further aspects, embodiments, and features will become apparent by reference to the figures and the following detailed description. The features and advantages of the disclosed systems and methods, as well as other aspects, advantages, and alternatives will become apparent to those of ordinary skill in the art by reading the following detailed description, with reference where appropriate to the accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF THE DRAWINGS

The embodiments, shown, disclosed, and described in the figures and specification are set forth only as examples. As such, those skilled in the art will appreciate that other arrangements and elements (e.g., machines, interfaces, functions, orders, and groupings of functions) can be used instead, and that some elements may be omitted altogether. Further, many of the elements shown and described herein are functional entities that may be implemented as discrete or distributed components or in conjunction with other components, and in any suitable combination and location. Various functions described herein as being performed by one or more entities may be carried out by hardware, firmware, and/or software (and any combination thereof). For example, one or more processors executing instructions stored in one or more tangible computer-readable memory components may implement one or more of the features and functions described herein.

Some embodiments comprise tangible, non-transitory computer readable media comprising instructions encoded thereon, where the instructions, when executed by one or more processors, cause one or more computing devices (for example, a computing system individually or in combination with a mobile terminal, or perhaps a mobile terminal individually or in combination with a computing system) to execute one or more methods comprising a series of one or more processes and/or sub-processes to perform the features and functions disclosed herein. In some embodiments, the sub-processes (or perhaps functions thereof) may be performed successively, simultaneously, or intermittently with other sub-processes (or perhaps functions thereof). Further, it is envisioned that some of the steps and/or functions of the sub-processes may be changed, may be substituted for, may be combined with other steps and/or functions of other sub-processors, or may be eliminated. Further, it is envisioned that some sub-processes and other disclosed methods may include additional steps not explicitly shown or described herein. The methods, processes, and sub-processes described herein are merely exemplary and those skilled in the art will recognize modifications that fall within the scope and spirit of the inventions disclosed and described herein.

Figure 1:
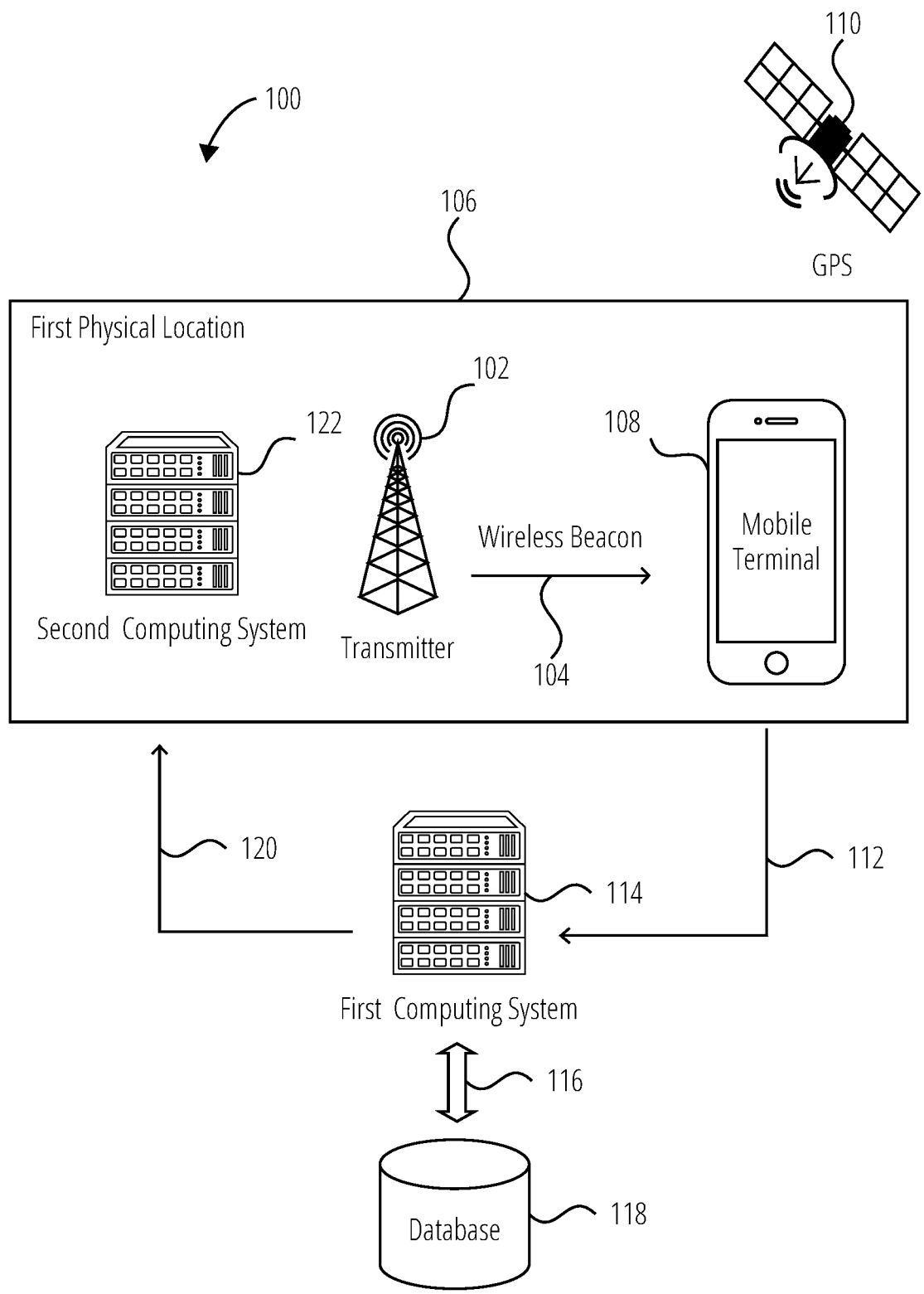
FIG. 1 illustrates a system 100 according to some embodiments.

FIG. 1 illustrates a system 100 according to some embodiments.

System 100 comprises a transmitter 102 and a first computing system 114. The transmitter 102 is configured to emit a wireless beacon 104 in a first physical location 106. The wireless beacon 104 is any type of wireless beacon now known or later developed. In some embodiments, the wireless beacon 104 is a Bluetooth Low Energy (BLE) beacon.

In operation, transmitter 102 is configured to emit the wireless beacon 104 periodically or at least semi periodically. In some embodiments, the transmitter 102 is configured to transmit an identifier via the wireless beacon 104. This identifier is sometimes referred to herein as a "beacon identifier." The beacon identifier is preferably but not necessarily a unique beacon identifier.

In some embodiments, the beacon identifier and/or the wireless beacon 104 is associated with the first physical location 106. In some embodiments, the association between the beacon identifier and the first physical location 106 is preferably but not necessarily stored in database 118.

The first physical location 106 can be any type of location that has a physical location, such as a store or restaurant, a bus stop or train station, a doctor's office or hospital, a home or office, or any other type of physical location. In some example embodiments, the first physical location 106 corresponds to a healthcare service provider, such as a doctor's office, clinic, hospital, or other healthcare service provider, and the mobile terminal is associated with a healthcare consumer or patient. However, the systems and methods disclosed and described herein are not limited to healthcare environments.

In some embodiments, the first physical location 106 is associated with one or more of (i) a street address, (ii) a Global Positioning System (GPS) location, and/or (iii) any other location identifier now known or later developed.

When a person brings his or her mobile terminal 108 into the first physical location 106 and within range of the wireless beacon 104, the mobile terminal 108 is configured to detect the wireless beacon 104 and receive the beacon identifier associated with the first physical location 106 via the wireless beacon 104. The mobile terminal 108 is illustrated in FIG. 1 as a mobile phone, but mobile terminal 108 could be any mobile computing device now known or later developed that is configured to detect wireless beacons and receive beacon identifiers or other data via wireless beacons, including but not limited to mobile phones, tablet computers, laptop computers, smart watches, smart jewelry, or other type of electronic communications device configured to perform the features and functions disclosed and described herein. After receiving the beacon identifier, the mobile terminal 108 is configured to send a set of one or more messages 112 to the first computing system 114.

In some embodiments, the set of one or more messages 112 includes one or more of: (i) an indication of the beacon identifier received via the wireless beacon 104 and/or any other identifier of the wireless beacon 104, (ii) the time that the mobile terminal 108 received the beacon identifier via the wireless beacon 104 or otherwise detected the wireless beacon 104, sometimes referred to herein as the "first time", and (iii) an indication of the geographic location of the mobile terminal 108 at the time (i.e., at the "first time") that the mobile terminal 108 received the beacon identifier via the wireless beacon 104.

In some embodiments, the indication of the geographic location of the mobile terminal 108 includes the GPS coordinates of the mobile terminal 108 based on GPS signals that the mobile terminal 108 receives from GPS satellites 110. In some embodiments, the mobile terminal 108 is configured to send the beacon identifier received via the wireless beacon 104 to the first computing system 114, and a separate tracking system (not shown) is configured to track the geographic location of the mobile terminal 108 and send the indication of the geographic location of the mobile terminal 108 (individually or in combination with the beacon identifier) to the first computing system 114. Additionally or alternatively, in some embodiment, the mobile terminal 108 is configured to send the beacon identifier received via the wireless beacon 104 to the first computing system 114, and the first computing system 114 is configured to track the geographic location of the mobile terminal 108 based at least in part on one or more messages comprising the geographic location of the mobile terminal 108 (individually or in combination with the beacon identifier) that the first computing system 114 receives from one or both of (i) the mobile terminal 108 and/or (ii) one or more other computing systems configured to track the geographic location of the mobile terminal 108.

After the first computing system 114 receives (i) the indication of the beacon identifier that the mobile terminal 108 received via the wireless beacon 104, (ii) the first time corresponding to when the mobile terminal 108 received the beacon identifier or otherwise detected the wireless beacon 104, and (iii) the indication of the geographic location of the mobile terminal 108, the first computing system 114 is configured to determine whether the geographic location of the mobile terminal at the first time is within a threshold distance from the first physical location 106 associated with the beacon identifier detected at the first time based at least in part on (i) the beacon identifier that the mobile terminal 108 received via the wireless beacon 104, (ii) the first time corresponding to when the mobile terminal 108 received the beacon identifier or otherwise detected the wireless beacon 104, and (iii) the indication of the geographic location of the mobile terminal 108.

In some embodiments, the threshold distance is measured from the geographic location of the first physical location 106. In some embodiments, different physical locations may have different threshold distances. For example, in some embodiments, the threshold distance for a large hospital might be larger than the threshold distance for a small doctor's office or clinic. In some embodiments, the threshold distance may correspond to a geographic boundary, geofence, or similar virtual or physical boundary surrounding or at least substantially surrounding or bordering the first physical location 106.

In some embodiments, the first computing system 114 is configured to determine whether the geographic location of the mobile terminal 108 at the first time is within the threshold distance from the first physical location 106 associated with the beacon identifier by (i) determining a street address associated with the beacon identifier (or perhaps the wireless beacon 104) by accessing database 118, which includes a plurality of associations between a plurality of wireless beacons (and/or beacon identifiers) and a corresponding plurality of street addresses and then (ii) determining whether the geographic location of the mobile terminal 108 is within the threshold distance of the street address associated with the wireless beacon 104 and/or beacon identifier.

In some embodiments, the first computing system 114 is additionally or alternatively configured to determine whether the geographic location of the mobile terminal 108 at the first time is within the threshold distance from the first physical location 106 associated with the beacon identifier by (i) determining a GPS location associated with the wireless beacon 104 (and/or beacon identifier) by accessing database 118, which includes a plurality of associations between a plurality of wireless beacons (and/or beacon identifiers) and a corresponding plurality of GPS locations and then (ii) determining whether the geographic location of the mobile terminal 108 is within the threshold distance of the GPS location associated with the wireless beacon 104 and/or beacon identifier.

In response to determining that the geographic location of the mobile terminal 108 at the first time is not within the threshold distance from the first physical location 106 associated with the wireless beacon 104 and/or beacon identifier, the first computing system 114 generates a first notification that the geographic location of the mobile terminal 108 at the first time is not within the threshold distance from the first physical location 106 associated with the wireless beacon 104 and/or beacon identifier.

In some embodiments, the first notification is an entry in a log or report generated by the first computing system 114. In some embodiments, generating the first notification additionally or alternatively includes sending a message or otherwise alerting a system operator of the first computing system 114 that the geographic location of the mobile terminal 108 is not within the threshold distance from the first physical location 106.

In some embodiments, after determining that the geographic location of the mobile terminal 108 is not within the threshold distance from the first physical location 106 associated with the wireless beacon 104 (and/or beacon identifier), the first computing system 114 is additionally configured to: (i) determine whether the transmitter 102 configured to emit the wireless beacon 104 has been relocated to a second physical location (not shown) that is different from the first physical location 106; and (ii) in response to determining that the transmitter 102 configured to emit the wireless beacon 104 has been relocated to the second physical location (not shown), update the database 118 comprising the plurality of associations between the plurality of wireless beacons (and/or beacon identifiers) and the corresponding plurality of physical locations to indicate that the transmitter 102 has been relocated to the second physical location (not shown).

In some embodiments, the first computing system 114 is configured to determine whether the transmitter 102 configured to emit the wireless beacon 104 has been relocated to a second physical location (not shown) that is different from the first physical location 106 by receiving an input or other configuration change from the system operator or other authorized user of the first computing system 114. In some embodiments, the first computing system 114 is configured to additionally or alternatively determine whether the transmitter 102 configured to emit the wireless beacon 104 has been relocated to the second physical location (not shown) that is different from the first physical location 106 by crowd sourcing multiple indications from multiple mobile terminals. For example, after receiving messages from multiple mobile terminals (not shown), where each mobile terminal has indicated that it received the beacon identifier transmitted by the transmitter 102 via wireless beacon 104 at a geographic location different from (or at least outside the threshold distance from) the first physical location 106, then in some embodiments, the first computing system 114 is configured to infer or conclude (or at least suggest to a system operator of the first computing system 114) that the transmitter 102 configured to emit the beacon identifier via wireless beacon 104 is no longer located at the first physical location 106.

In some embodiments, in response to determining that the geographic location of the mobile terminal 108 is within the threshold distance from the first physical location 106 associated with the wireless beacon 104 and/or beacon identifier, the first computing system 114 is configured to generate a second notification that the geographic location of the mobile terminal 108 at the first time is within the threshold distance from the first physical location 106 associated with the wireless beacon 104 and/or beacon identifier transmitted by the transmitter 102 via the wireless beacon 104.

In some embodiments, the second notification is an entry in a log or report generated by the first computing system 114. In some embodiments, generating the second notification may additionally or alternatively include sending a message or otherwise alerting a system operator of the first computing system 114 that the geographic location of the mobile terminal 108 is within the threshold distance from the first physical location 106.

In some example embodiments where the first physical location 106 is a healthcare service provider's place of business (e.g., a doctor's office, clinic, hospital, or other healthcare service provider) and the mobile terminal is associated with a healthcare consumer (or patient), the first computing system 114 is configured to determine whether the geographic location of the healthcare consumer's mobile terminal 108 at the first time is within the threshold distance from the healthcare service provider's place of business, i.e., the first physical location 106 where the transmitter 102 is located. When the first computing system 114 determines that the geographic location of the healthcare consumer's mobile terminal 108 at the first time is within the threshold distance from the healthcare consumer's place of business (i.e., the first physical location 106 associated with the wireless beacon 104 (and/or beacon identifier) detected at the first time), then the first computing system 114 is in effect verifying that the healthcare consumer (or at least the healthcare consumer's mobile terminal 108) is physically present at the healthcare service provider's place of business.

In such embodiments, by verifying that the healthcare consumer was physically present at the healthcare service provider's place of business, the systems and methods disclosed herein help prevent (or at least reduce) fraud associated with healthcare service providers submitting false claims to health insurance companies for payment for healthcare services that the healthcare service provider did not actually provide to the healthcare consumer and/or fraud associated with healthcare consumers submitting false claims to health insurance companies for payment for healthcare services that the healthcare consumer did not actually receive from the healthcare service provider.

In some embodiments, generating the second notification additionally or alternatively includes sending one or more messages 120 to the second computing system 122. In the example embodiments where the first physical location 106 is a healthcare service provider's place of business (e.g., a doctor's office, clinic, hospital, or other healthcare service provider) and the mobile terminal is associated with a healthcare consumer (or patient), the second computing system 122 is located at or otherwise associated with the healthcare service provider, and the one or more messages 120 comprise at least one confirmation message informing the healthcare service provider that the healthcare consumer has healthcare insurance.

In contrast to traditional insurance verification methods where a healthcare service provider asks a healthcare consumer's insurance company to confirm that the healthcare consumer has health insurance, in some embodiments, the operator of the first computing system 114 (e.g., a health insurance company or other third party contracted by the health insurance company) proactively sends a message to the healthcare service provider to confirm that the healthcare consumer who is physically present at the healthcare service provider's place of business to receive healthcare services (based on the wireless beacon methods described above) has health insurance.

This scenario improves upon traditional healthcare information systems and reduces computing processor and network bandwidth requirements as compared to traditional methods by reducing the number of messages that need to be generated, transmitted, received, and processed between the first computing system 114 operated in some embodiments by a health insurance company and the second computing system 122 operated in some embodiments by a healthcare service provider.

For example, in the disclosed systems and methods, the second computing system 122 does not need to first generate and send one or more requests to the first computing system 114 asking whether a healthcare consumer has insurance coverage, and the second computing system 122 does not need to process and reply to the one or more requests received from the second computing system 122. Instead, the first computing system 114 sends one or more messages 120 to the second computing system 122 confirming that the healthcare consumer associated with the mobile terminal 108 has insurance coverage in response to (or at least after) determining that the geographic location of the mobile terminal 108 is within the threshold distance from the first physical location 106 (i.e., the healthcare service provider's place of business) associated with the wireless beacon 104 and/or beacon identifier, as described herein.

In addition to confirming insurance coverage, in some embodiments, the one or more messages 120 may additionally include aspects of the healthcare consumer's medical information, e.g., allergies, current ailments, past treatments, and/or other information that the healthcare consumer would likely otherwise provide to the healthcare service provider when the healthcare consumer arrives at the healthcare service provider to receive healthcare services. Providing these aspects of the healthcare consumer's medical information to the healthcare service provider in the manner described above further improves upon traditional healthcare information systems and reduces the amount of manual data entry systems that would otherwise be required by the second computing system 122 (operated by the healthcare service provider) by reducing the number of data entry terminals and associated equipment (monitors, keyboards, pointing devices, card readers, etc.) at the second computing system 122 for capturing patient information.

In some embodiments, after generating the second notification that the geographic location of the mobile terminal 108 at the first time is within the threshold distance from the first physical location 106 associated with the wireless beacon 104 and/or beacon identifier, the first computing system 114 is configured to wait to receive an update from at least one of (i) the mobile terminal 108 or (ii) a computing system configured to track the location of the mobile terminal 108, wherein the update indicates that the mobile terminal 108 has moved outside the threshold distance from the first physical location 106 and a time (sometimes but not exclusively referred to herein as a "second time") when the mobile terminal 108 moved outside the threshold distance from the first physical location 106. In some embodiments, in response to (or at least after) the first computing system 114 receives the update with the second time, the first computing system 114 is further configured to calculate a duration of time between the first time and the second time, where (i) the first time is the time (or at least approximate time) when the mobile terminal 108 received the beacon identifier via the wireless beacon 104, and (ii) the second time is the time (or at least approximate time) when the mobile terminal 108 moved outside the threshold distance from the first physical location 106. In addition to determining the duration of time, in some embodiments the first computing system 114 is additionally configured to solicit feedback from a person associated with the mobile terminal 108, where the feedback is related to activities in which the person engaged during the determined duration of time and/or events that occurred during the determined duration of time.

In the example embodiments where the first physical location 106 is a healthcare service provider's place of business (e.g., a doctor's office, clinic, hospital, or other healthcare service provider) and the mobile terminal 108 is associated with a healthcare consumer (or patient), the first time corresponds to when the patient arrived at the healthcare service provider's facility (i.e., when the patient arrived at the doctor's office, clinic, hospital, etc.), the second time corresponds to when the patient left the healthcare service provider's facility, and the determined duration of time corresponds to the duration of the healthcare consumer's appointment, i.e., the length of time that the healthcare consumer was at the healthcare service provider's facility to receive healthcare services. Determining the duration of the healthcare consumer's appointment in this manner enables the first computing system 114 to later compare insurance claims (or data extracted from insurance claims) submitted for the appointment with the duration of time for the appointment to determine whether the duration of the appointment was reasonable in view of the healthcare services provided by the healthcare service provider, as reflected on the insurance claim, which can help the insurance company (i) identify potentially fraudulent claims which may be suggested by the insurance claim associated with the appointment if/when the insurance claim reflects more (or perhaps different) healthcare services than could have been realistically provided by the healthcare service provider during the duration of the appointment, and/or (ii) identify potential violations of service level agreements between the insurance company and the healthcare service provider which may be suggested by an appointment duration that is unreasonably long in view of the quantity and type of healthcare services rendered by the healthcare service provider during the appointment, as reflected in the insurance claim associated with the appointment.

In some embodiments, the systems and methods disclosed herein can be used to determine and track waiting times at a healthcare service provider facility. For example, in some embodiments, the wireless beacon 104 is a first wireless beacon at the first physical location 106, and the first physical location 106 comprises a plurality of rooms, where the first wireless beacon 104 is associated with a first room at the first physical location 106 and where a second wireless beacon (not shown) is associated with a second room (not shown) at the first physical location 106. In this example, the first room is a waiting room at the healthcare service provider facility where the healthcare consumer waits to receive healthcare services, and the second room is a room (e.g., an examination room, operating room, or other room) where the healthcare consumer actually receives the healthcare services.

In the example embodiments described above, the first computing system 114 receives a fourth indication that the mobile terminal 108 has detected the second wireless beacon (not shown) or second beacon identifier (not shown) associated with the second room (not shown) at a fourth time. And in response to receiving the fourth indication, the first computing system 114 determines an amount of time that has elapsed between the first time when the mobile terminal 108 detected the first wireless beacon 104 and the fourth time when the mobile terminal 108 detected the second wireless beacon (not shown). After determining the elapsed time between the first time and the fourth time, the first computing system 114 stores the elapsed time as a "wait time" in the database 118 (or perhaps a different database) and associates that "wait time" with the specific instance of the healthcare service received by the healthcare consumer associated with mobile terminal 108. In some embodiments, the database 118 (or the different database) is configured to store plurality of wait times corresponding to a plurality of instances of healthcare services received by a plurality of healthcare consumers. In this manner, the operator of the first computing system 114 can track wait times experienced by healthcare consumers at the first physical location 106 over time. Subsequent analysis of this collection of wait times can in some embodiments be used to track whether a particular healthcare service provider is meeting one or more service level agreements, e.g., determining whether the healthcare service provider is meeting a service level agreement that requires patients to be seen within a certain amount of time (e.g., 30 minutes, 45 minutes, or some other duration) after arriving at the healthcare service provider's facility to receive healthcare services.

In alternative embodiments, the systems and methods disclosed herein can be used to determine and track waiting times experienced by bus riders. For example, in some embodiments, the first physical location 106 is a bus stop, the wireless beacon 104 is a first wireless beacon at bus stop, and a second wireless beacon (not shown) is on a bus that stops at the bus stop to pick up riders, such as a rider associated with mobile terminal 108.

In the example bus wait time embodiments described above, the first computing system 114 receives, among other indications, a first indication that the mobile terminal 108 has detected the first wireless beacon 104 at the bus stop at a first time, and then later, the first computing system 114 receives a later indication that the mobile terminal 108 has detected the second wireless beacon (not shown) on the bus at a later time. And in response to receiving the later indication, the first computing system 114 determines an amount of time that has elapsed between the first time when the mobile terminal 108 detected the first wireless beacon 104 and the later time when the mobile terminal 108 detected the second wireless beacon (not shown) on the bus. After determining the elapsed time between the first time and the later time, the first computing system 114 stores the elapsed time as a "wait time" in the database 118 (or perhaps a different database) and associates that "wait time" with a bus rider associated with mobile terminal 108. In some embodiments, the database 118 (or the different database) is configured to store plurality of wait times corresponding to a plurality of bus riders. In this manner, the operator of the first computing system 114 can track wait times experienced by bus riders at the first physical location 106 (the bus stop) over time. Analysis of this collection of wait times can in some embodiments be used to improve bus scheduling.

Additionally, in the example embodiments where the first physical location 106 is a healthcare service provider's place of business (e.g., a doctor's office, clinic, hospital, or other healthcare service provider) and the mobile terminal 108 is associated with a healthcare consumer (or patient), soliciting feedback from the healthcare consumer associated with the mobile terminal 108 about his or her experience during the appointment helps the insurance company (i) identify potentially fraudulent claims which may be suggested by the insurance claim associated with the appointment if/when the insurance claim reflects more and/or different healthcare services than the healthcare consumer reported that he or she received in response to the solicited feedback, and/or (ii) identify potential violations of service level agreements between the insurance company and the healthcare service provider and/or measure other healthcare service quality metrics (good and bad) via the information that the healthcare consumer provides to the insurance company via the mobile terminal 108 after the appointment. In some embodiments, soliciting feedback from the patient as soon as practicably and reasonably possible after the appointment (e.g., in response to determining that the mobile terminal 108 has moved outside of the threshold distance from the first physical location 106 or very soon thereafter) improves the likelihood that the healthcare consumer will be able to provide a more accurate assessment of his or her experience during the appointment while the appointment is still fresh in the healthcare consumer's memory.

Also, in the above-described embodiments where the first physical location 106 is a healthcare service provider's place of business (e.g., a doctor's office, clinic, hospital, or other healthcare service provider) and the mobile terminal 108 is associated with a healthcare consumer (or patient), the first computing system 114 in some embodiments can be configured to additionally or alternatively detect a potentially fraudulent insurance claim based on whether the geographic location of the mobile terminal 108 at the first time was within the threshold distance from the first physical location 106 associated with the first wireless beacon 104 detected at the first time.

For example, for an insurance claim associated with the healthcare consumer at the first time, the first computing system 114 is configured to determine whether it previously generated either (i) the first notification that the geographic location of the mobile terminal 108 at the first time was not within the threshold distance from the first physical location 106 (i.e., the healthcare service provider's facility) associated with the wireless beacon 104 or (ii) the second notification that the geographic location of the mobile terminal 108 at the first time was within the threshold distance from the first physical location 106 (i.e., the healthcare service provider's facility) associated with the wireless beacon 104. And when the first computing system 114 determines that it previously generated the first notification that the geographic location of the mobile terminal 108 at the first time was not within the threshold distance from the first physical location 106 (i.e., the healthcare service provider's facility) associated with the wireless beacon 104, then the first computing system 114 in some embodiments additionally generates a third notification to investigate the insurance claim for fraud. In this scenario, if the first computing system 114 previously determined that it received the first indication that the patient's mobile terminal 108 had detected the wireless beacon 104 associated with the healthcare service provider's facility at a time when the geographic position of the patient's mobile terminal 108 suggested that the patient's mobile terminal 108 was not physically present at the healthcare service provider's facility (i.e., the geographic location of the mobile terminal 108 was not within the threshold distance from the first physical location 106 (the healthcare service provider's facility)), then the discrepancy could, in some instances, suggest a fraudulent insurance claim. However, as described previously, this discrepancy could also indicate that the transmitter 102 configured to the emit the wireless beacon 104 has been moved from the first physical location 106 to a second physical location (not shown). But in either or both cases, the first computing system 114 in some embodiments is configured to generate a notification so that the cause of the discrepancy can be investigated further.

Figure 2:
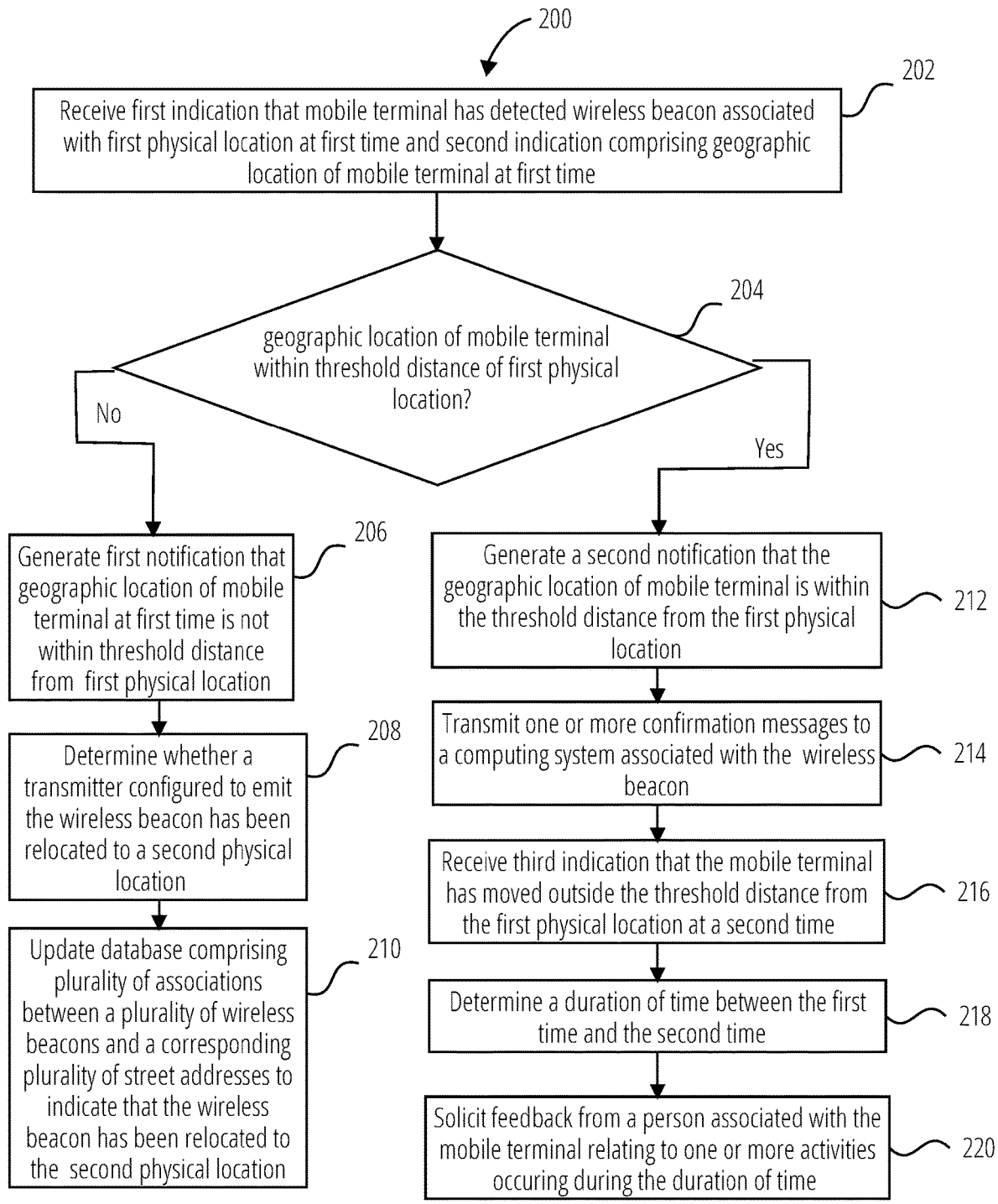
FIG. 2 illustrates a method 200 according to some embodiments.

FIG. 2 illustrates a method 200 according to some embodiments.

In some embodiments, one or more (or perhaps all) of the features, functions, steps, and/or aspects of method 200 are performed by a computing system, such as the first computing system 114 shown and described with reference to FIG. 1. In some embodiments, one or more of the features, functions, steps, and/or aspects of method 200 may be performed by a computing system, such as the first computing system 114, and one or more other steps may be performed by a mobile terminal, such as the mobile terminal 108. In still further embodiments, any of the features of method 200 are performed by any one or more computing systems and/or computing devices, individually or in combination with each other, including any of the first computing system 114, the second computing system 122, the mobile terminal 108, and/or one or more other computing systems and/or devices. Further, any of the features and functions described with reference to FIG. 1 may be performed as a part of sub-part of the individual method steps of method 200.

Method 200 begins at block 202, which includes receiving a first indication that a mobile terminal has detected a wireless beacon (and/or beacon identifier) associated with a first physical location and a second indication comprising a geographic location of the mobile terminal at a first time. In some embodiments, the mobile terminal is any mobile terminal now known or later developed, including but not limited to mobile terminal 108 (FIG. 1). In some embodiments, the wireless beacon may be any type of wireless beacon now known or later developed, including but not limited to wireless beacon 104 (FIG. 1).

In some embodiments, the wireless beacon is a Bluetooth Low Energy (BLE) beacon. In some embodiments, the first indication comprises a beacon identifier received by the mobile terminal via the wireless beacon.

In some embodiments, the second indication comprising the geographic location of the mobile terminal at the first time comprises global positioning system (GPS) coordinates corresponding to the geographic location of the mobile terminal. In some embodiments, the geographic location of the mobile terminal at the first time additionally or alternatively comprises any other type of geographic location convention, e.g., an address, map coordinates, and/or any other type of geographic location convention now known or later developed.

Next, method 200 advances to decision block 204, which includes determining whether the geographic location of the mobile terminal is within a threshold distance from the first physical location. In some embodiments, determining whether the geographic location of the mobile terminal is within the threshold distance from the first physical location is performed by the mobile terminal. In other embodiments, determining whether the geographic location of the mobile terminal is within the threshold distance from the first physical location is performed by a computing system configured to track the geographic location of the mobile terminal. For example, in some of the embodiments shown and described with reference to FIG. 1, the first computing system 114 is configured to track the geographic location of the mobile terminal 108, and in such embodiments, the step of determining whether the geographic location of the mobile terminal is within the threshold distance from the first physical location is performed by the mobile terminal in block 204 is performed in whole or in part by the first computing system 114. In such embodiments, the computing system 114 receives the first indication (comprising the beacon identifier) and the second indication (comprising the geographic location of the mobile terminal at the first time), and the first computing system 114 determines one or more of (i) whether (and in some embodiments, when) the mobile terminal is within the threshold distance from the first physical location, (ii) whether (and in some embodiments, when) the mobile terminal is not within the threshold distance from the first physical location, and/or (iii) whether (and in some instances when) the mobile terminal has moved outside of the threshold distance from the first physical location after previously being within the threshold distance from the first physical location.

In some embodiments, determining whether the geographic location of the mobile terminal at the first time is within the threshold distance from the first physical location associated with the wireless beacon detected at the first time at block 204 comprises: (i) determining a street address associated with the wireless beacon (or beacon identifier) by accessing a database comprising a plurality of associations between a plurality of wireless beacons (or beacon identifiers) and a corresponding plurality of street addresses; and (ii) determining whether the geographic location of the mobile terminal is within the threshold distance of the street address associated with the wireless beacon (or beacon identifier). In other embodiments, determining whether the geographic location of the mobile terminal at the first time is within the threshold distance from the first physical location associated with the wireless beacon detected at the first time additionally or alternatively comprises: (i) determining a GPS location associated with the wireless beacon (or beacon identifier) by accessing a database comprising a plurality of associations between a plurality of wireless beacons (or beacon identifiers) and a corresponding plurality of GPS locations; and (ii) determining whether the geographic location of the mobile terminal is within the threshold distance of the GPS location associated with the wireless beacon (or beacon identifier).

If at decision block 204, it is determined that the geographic location of the mobile terminal at the first time is not within the threshold distance from the first physical location associated with the wireless beacon (or beacon identifier), then method 200 advances to block 206. Determining whether the geographic location of the mobile terminal is within the threshold distance from the first physical location can be carried out in any of the manners disclosed herein.

Method block 206 includes generating a first notification that the geographic location of the mobile terminal at the first time is not within the threshold distance from the first physical location. In operation, the first notification can take any of the forms disclosed herein, and generation of the first notification can be accomplished by any of the methods and/or manners disclosed herein.

In some embodiments, after block 206, method 200 advances to block 208, which includes determining whether a transmitter configured to emit the wireless beacon (e.g., transmit the beacon identifier via the wireless beacon) has been relocated to a second physical location. In operation, determining whether the transmitter configured to emit the wireless beacon has been relocated from the first physical location to the second physical location can be carried out in any of the manners disclosed herein.

After block 208, method 200 in some embodiments advances to block 210, which includes updating a database (e.g., database 118 (FIG. 1)) comprising a plurality of associations between a plurality of wireless beacons (or beacon identifiers) and a corresponding plurality of street addresses (or other geographic location convention, e.g., GPS coordinates or other conventions) to indicate that the wireless beacon 104 (or at least the transmitter configured to transmit the beacon identifier via the wireless beacon) has been relocated to the second physical location.

But if at decision block 204, it is determined that the geographic location of the mobile terminal is within the threshold distance from the first physical location associated with the wireless beacon (or beacon identifier), then method 200 advances to block 212. As mentioned earlier, determining whether the geographic location of the mobile terminal is within the threshold distance from the first physical location can be carried out in any of the manners disclosed herein.

Method block 212 includes generating a second notification that the geographic location of the mobile terminal is within the threshold distance from the first physical location. In operation, the second notification can take any of the forms disclosed herein, and generation of the second notification can be accomplished by any of the methods and/or manners disclosed herein.

In some embodiments, after block 212, method 200 advances to block 214, which includes transmitting one or more confirmation messages to a computing system associated with the wireless beacon. As described in more detail herein, in some embodiments, the first physical location corresponds to a healthcare service provider, and the mobile terminal is associated with a healthcare consumer. In these example embodiments, determining whether the geographic location of the mobile terminal at the first time is within the threshold distance from the first physical location associated with the wireless beacon (or beacon identifier) detected at the first time comprises verifying whether the healthcare consumer is physically present at a place of business associated with the healthcare service provider, e.g., a doctor's office, clinic, hospital, or other healthcare service provider facility. In such embodiments, transmitting the one or more confirmation messages at block 214 comprises an insurance company transmitting to a computing system associated with healthcare service provider, one or more of (i) a confirmation that the healthcare consumer associated with the mobile terminal has health insurance, and/or (ii) personal medical information that the healthcare consumer would likely provide to the healthcare service provider when checking in to the healthcare service provider facility, including but not limited to any of the personal medical information disclosed herein.

In some embodiments, after block 214, method 200 advances to block 216, which includes receiving a third indication that the mobile terminal has moved outside a threshold distance from the first physical location at a second time. In operation, the third indication can take any of the forms disclosed herein and may be accomplished by any of the methods and/or manners disclosed herein. For example, in some embodiments the third indication is received from the mobile terminal in response to (or at least after) the mobile terminal having moved outside of the threshold distance from the first physical location. And in some embodiments, the third indication is received from one or more computing systems configured to monitor the geographic location of the mobile terminal.

In some embodiments, after block 216, method 200 advances to block 218, which includes determining a duration of time between the first time and the second time, where (i) the first time is the time (or at least approximate time) when the mobile terminal received the beacon identifier via the wireless beacon, and (ii) the second time is the time (or at least approximate time) when the mobile terminal moved outside the threshold distance from the first physical location.

And in some embodiments, after block 218, method 200 advances to block 220, which includes soliciting feedback from a person associated with the mobile terminal, where the feedback relates to one or more activities occurring during the duration of time determined at block 218. The solicited feedback may take any of the forms disclosed herein, and the solicitation of the feedback and the receipt of the feedback in response to the solicitation may be accomplished according to any of the methods and/or manners disclosed herein.

Figure 3:
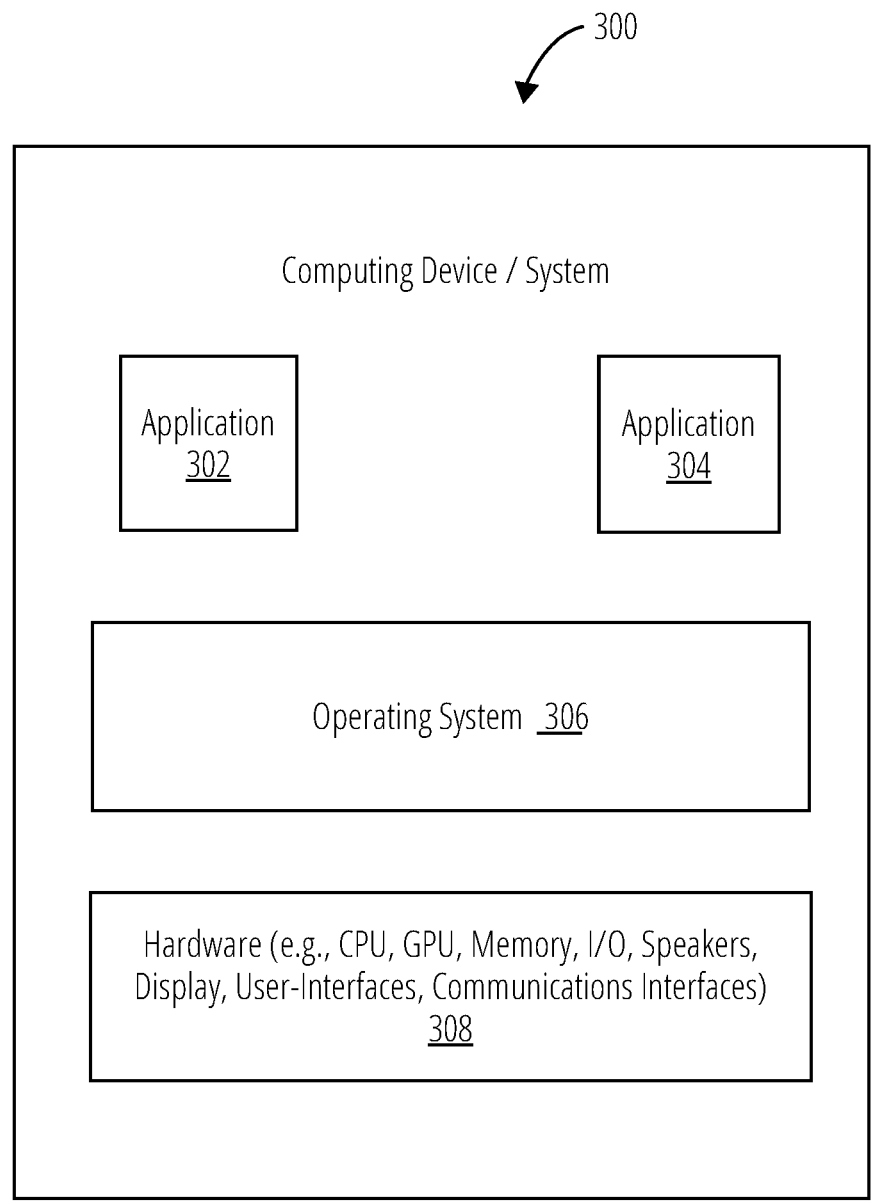
FIG. 3 illustrates a computing device/system 300 according to some embodiments.

FIG. 3 illustrates a computing device/system 300 configured to execute one or more (or all) of the features and functions disclosed and described herein, either individually or in combination with one or more other computing devices/systems, according to some embodiments.

The computing device/system 300 may be a smartphone, tablet, desktop or laptop computer, or any other type of mobile computing device now known or later developed with the capability of performing the functions performed by mobile terminal 108 (FIG. 1), including but not limited to one or more of the functions of method 200 (FIG. 2). Additionally, the computing device/system 300 may be a server system, database system, cloud computing system, or any other type of computing system now known or later developed with the capability of performing the functions performed by either the first computing system 114 (FIG. 1) and/or the second computing system 122 (FIG. 1), including but not limited to one or more of the functions of method 200 (FIG. 2).

The computing device/system 300 includes hardware 308 comprising one or more (or all) of: (i) one or more processors (e.g., a central processing unit(s) or CPU(s) and/or graphics processing unit(s) or GPU(s)); (ii) one or more tangible non-transitory computer-readable media and/or other forms of computer-readable memory; (iii) one or more input/output components (e.g., speaker(s), sensor(s), display(s), headphone jack(s) or other interfaces); and (iv) one or more communications interfaces (wireless and/or wired). The hardware 308 components of the computing device/system 300 are configured to run software, including an operating system 306 (or similar) and one or more applications, such as application 302 and application 304 (or similar) as is known in the computing arts. One or more of application 302 and application 304 may correspond to computer-executable program code that, when executed by the one or more processors of hardware 308, cause the computing device/system 300 to perform one or more of the functions and features described herein, including but not limited to any (or all) of the features and functions performed by the mobile terminal 108, first computing system 114, and second computing system 122 (FIG. 1), as well as any or all of the features and functions of method 200 and any and all other ancillary features and functions known to persons of ordinary skill in the computing arts that may be required or at least desired for effective implementation of the features and functions of system 100 (FIG. 1) and method 200 (FIG. 2), even if such ancillary features and/or functions are not expressly disclosed herein.

Some embodiments have been described with reference to particular features and functions. In view of the disclosure herein, it will be apparent to those skilled in the art that various modifications and variations can be made to the embodiments disclosed and described herein without departing from the scope or spirit of the invention(s). One skilled in the art will recognize that the disclosed features and functions may be used singularly, in any combination, or omitted based on the requirements and specifications of a given application or design.

What is claimed is:
1. A method performed by a computing system, the method comprising:
receiving a first set of one or more messages comprising: (i) a first indication that a mobile terminal associated with a patient has detected a first wireless beacon at a first time and a date, and (ii) a second indication comprising a geographic location of the mobile terminal at the first time;
determining whether the geographic location of the mobile terminal at the first time is within a threshold distance from a healthcare service provider location associated with the first wireless beacon detected by the mobile terminal at the first time;
in response to determining that the geographic location of the mobile terminal at the first time is not within the threshold distance from the healthcare service provider location associated with the first wireless beacon:
flagging insurance claims for healthcare services performed on the date by the healthcare service provider for the patient associated with the mobile terminal for fraud review; and
generating a notification to an operator of the computing system that the geographic location of the mobile terminal at the first time is not within the threshold distance from the healthcare service provider location associated with the first wireless beacon, thereby facilitating an update, in a database of the computing system that associates one or more wireless beacons with one or more physical address locations, of a location associated with the first wireless beacon with a new location determined to be associated with a location of the first wireless beacon;
in response to determining that the geographic location of the mobile terminal is within the threshold distance from the healthcare service provider location associated with the first wireless beacon, generating an indication that the patient was at the healthcare service provider location on the date;
receiving a second set of one or more messages comprising a third indication that the mobile terminal has moved outside the threshold distance from the healthcare service provider location at a second time;
in response to receiving the third indication, determining a duration of time between the first time and the second time;
comparing the duration of time with an expected time associated with an insurance claim submitted by the healthcare service provider; and
flagging the insurance claim for fraud review when the duration of time between the first time and the second time is below a threshold amount of the expected time.

2. The method of claim 1, wherein the first wireless beacon is a Bluetooth Low Energy (BLE) beacon comprising a beacon identifier.

3. The method of claim 1, wherein the first indication comprises a beacon identifier received by the mobile terminal via the first wireless beacon.

4. The method of claim 1, wherein the second indication comprising the geographic location of the mobile terminal at the first time comprises global positioning system (GPS) coordinates corresponding to the geographic location of the mobile terminal.

5. The method of claim 1, wherein determining whether the geographic location of the mobile terminal at the first time is within the threshold distance from the healthcare service provider location associated with the first wireless beacon detected at the first time and date comprises:
 determining a street address associated with the first wireless beacon by accessing a database comprising a plurality of associations between a plurality of wireless beacons and a corresponding plurality of street addresses; and
 determining whether the geographic location of the mobile terminal is within the threshold distance of the street address associated with the first wireless beacon.

6. The method of claim 1, further comprising:
 after generating the indication that the patient was at the healthcare service provider location on the date, soliciting feedback from the patient associated with the mobile terminal, the feedback relating to one or more healthcare services received by the patient during the duration of time.

7. The method of claim 1, wherein the healthcare service provider location comprises a plurality of rooms, wherein the first wireless beacon is associated with a first room at the healthcare service provider location, wherein a second wireless beacon is associated with a second room at the healthcare service provider location, and wherein the method further comprises:
 receiving an indication from the mobile terminal that the mobile terminal has detected the second wireless beacon associated with the second room at a second time;
 in response to receiving the indication from the mobile terminal that the mobile terminal has detected the second wireless beacon associated with the second room at a third time, determining an amount of time between receiving the first time and the second time; and
 storing the amount of time as a wait time associated with healthcare service provider location in a database comprising a plurality of wait times.

8. The method of claim 1, further comprising, after determining that the geographic location of the mobile terminal is not within the threshold distance from the healthcare service provider location associated with the first wireless beacon, additionally:
 determining whether the healthcare service provider has moved to a new address; and
 in response to determining that the healthcare service provider has moved to the new address, updating a database comprising a plurality of healthcare service provider addresses to reflect the new address for the healthcare service provider.

9. The method of claim 1, further comprising:
 receiving a request from the healthcare service provider to verify that the patient associated with the mobile terminal is enrolled in health insurance at the first time;
 in response to the receiving the request, determining whether the patient is enrolled in health insurance at the first time;
 in response to determining that the patient is enrolled in health insurance at the first time, transmitting a coverage authorization message to one or both of the healthcare service provider and the patient; and
 in response to determining that the patient is not enrolled in health insurance at the first time, transmitting a coverage denial message to one or both of the healthcare service provider and the patient.

10. Tangible, non-transitory computer-readable media having instructions stored therein, wherein the instructions, when executed by one or more processors, causes a computing system to perform functions comprising:
 receiving a first set of one or more messages generated by a mobile terminal associated with a patient comprising: (i) a first indication that the mobile terminal has received a first beacon identifier via a first wireless beacon at a first time and date, and (ii) a second indication comprising a geographic location of the mobile terminal at the first time;
 determining whether the geographic location of the mobile terminal at the first time is within a threshold distance from a healthcare service provider location associated with the first beacon identifier received by the mobile terminal at the first time;
 in response to determining that the geographic location of the mobile terminal at the first time is not within the threshold distance from the healthcare service provider location associated with the first beacon identifier:
  flagging insurance claims for healthcare services performed on the date by the healthcare service provider for the patient associated with the mobile terminal for fraud review; and
  generating a notification to an operator of the computing system that the geographic location of the mobile terminal at the first time is not within the threshold distance from the healthcare service provider location associated with the first wireless beacon, thereby facilitating an update, in a database of the computing system that associates one or more wireless beacons with one or more physical address locations, of a location associated with the first wireless beacon with a new location determined to be associated with a location of the first wireless beacon;
 in response to determining that the geographic location of the mobile terminal is within the threshold distance from the healthcare service provider location associated with the first beacon identifier, generating an indication that the patient was at the healthcare service provider location on the date;
 receiving a second set of one or more messages comprising a third indication that the mobile terminal has moved outside the threshold distance from the healthcare service provider location at a second time;
 in response to receiving the third indication, determining a duration of time between the first time and the second time;
 comparing the duration of time with an expected time associated with an insurance claim submitted by the healthcare service provider; and
 flagging the insurance claim for fraud review when the duration of time between the first time and the second time is below a threshold amount of the expected time.

11. The tangible, non-transitory computer-readable media of claim 10, wherein the first wireless beacon is a Bluetooth Low Energy (BLE) beacon transmitting the first beacon identifier.

12. The tangible, non-transitory computer-readable media of claim 10, wherein the first indication comprises the first beacon identifier received by the mobile terminal via the first wireless beacon.

13. The tangible, non-transitory computer-readable media of claim 10, wherein the second indication comprising the geographic location of the mobile terminal at the first time comprises global position system (GPS) coordinates corresponding to the geographic location of the mobile terminal.

14. The tangible, non-transitory computer-readable media of claim 10, wherein determining whether the geographic location of the mobile terminal at the first time is within the threshold distance from the healthcare service provider location associated with the first beacon identifier received at the first time and date comprises:
   determining a street address associated with the first beacon identifier by accessing a database comprising a plurality of associations between a plurality of beacon identifiers and a corresponding plurality of GPS locations; and
   determining whether the geographic location of the mobile terminal is within the threshold distance of the GPS location associated with the first beacon identifier.

15. The tangible, non-transitory computer-readable media of claim 10, wherein the functions further comprise, after generating the indication that the patient was at the healthcare service provider location on the date, soliciting feedback from the patient associated with the mobile terminal, the feedback relating to one or more healthcare services received by the patient during the duration of time.

16. The tangible, non-transitory computer-readable media of claim 10, wherein the healthcare service provider location comprises a plurality of rooms, wherein the first beacon identifier is associated with a first room at the healthcare service provider location, wherein a second beacon identifier is associated with a second room at the healthcare service provider location, and wherein the functions further comprise:
   receiving an indication from the mobile terminal that the mobile terminal has detected the second beacon identifier associated with the second room at a second time;
   in response to receiving the indication from the mobile terminal that the mobile terminal has detected the second wireless beacon associated with the second room at a second time, determining an amount of time between receiving the first time and the second time; and
   storing the amount of time as a wait time associated with healthcare service provider location in a database comprising a plurality of wait times.

17. The tangible, non-transitory computer-readable media of claim 10, wherein the functions further comprise, after determining that the geographic location of the mobile terminal is not within the threshold distance from the healthcare service provider location associated with the first beacon identifier, additionally:
   determining whether the healthcare service provider has moved to a new address; and
   in response to determining that the healthcare service provider has moved to a new address, updating a database comprising a plurality of associations between a plurality of healthcare service provider addresses to reflect the new address for the healthcare service provider.

18. The tangible, non-transitory computer-readable media of claim 10, wherein the functions further comprise:
   receiving a request from the healthcare service provider to verify that the patient associated with the mobile terminal is enrolled in health insurance at the first time;
   in response to the receiving the request, determining whether the patient is enrolled in health insurance at the first time;
   in response to determining that the patient is enrolled in health insurance at the first time, transmitting a coverage authorization message to one or both of the healthcare service provider and the patient; and
   in response to determining that the patient is not enrolled in health insurance at the first time, transmitting a coverage denial message to one or both of the healthcare service provider and the patient.

* * * * *